United States Patent
Zemach et al.

(10) Patent No.: US 10,146,710 B1
(45) Date of Patent: Dec. 4, 2018

(54) MULTIPLE INPUT MULTIPLE OUTPUT ARBITER DEVICE

(71) Applicant: Marvell Israel (M.I.S.L) Ltd., Yokneam (IL)

(72) Inventors: Rami Zemach, Givat Shapira (IL); Dror Bromberg, Michmoret (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 290 days.

(21) Appl. No.: 15/237,370

(22) Filed: Aug. 15, 2016

Related U.S. Application Data

(60) Provisional application No. 62/205,139, filed on Aug. 14, 2015.

(51) Int. Cl.
| | | |
|---|---|---|
| *G06F 13/00* | (2006.01) | |
| *G06F 12/00* | (2006.01) | |
| *G06F 13/16* | (2006.01) | |
| *G06F 13/42* | (2006.01) | |

(52) U.S. Cl.
CPC ...... *G06F 13/1642* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 8,553,582 B1 | 10/2013 | Mizrahi et al. | |
| 8,725,873 B1 | 5/2014 | Bromberg | |
| 9,306,876 B1 | 4/2016 | Ulman et al. | |
| 9,485,326 B1 | 11/2016 | Ulman et al. | |
| 9,824,058 B2 * | 11/2017 | Barner | G06F 13/4282 |
| 2007/0032246 A1 * | 2/2007 | Feher | H04W 64/00 455/456.1 |
| 2014/0122771 A1 * | 5/2014 | Chrysos | G06F 13/36 710/317 |
| 2015/0278136 A1 * | 10/2015 | Chrysos | G06F 13/362 710/124 |
| 2016/0301544 A1 * | 10/2016 | Zinner | H04L 12/40182 |

* cited by examiner

*Primary Examiner* — Hyun Nam

(57) ABSTRACT

An arbiter device, during a given clock cycle, determines an ordered set corresponding to a plurality of first interfaces. The ordered set indicates whether each first interfaces of the plurality of first interfaces is available for selection for a second interface of a plurality of second interfaces during the given clock cycle. The arbiter device, during the given clock cycle, selects a respective available first interface, from the ordered set corresponding to the plurality of first interfaces, for each of the plurality of second interfaces. Selecting an available first interface for a particular one of the second interfaces is performed in parallel with and independently from selecting available first interfaces for other ones of the second interfaces. The arbiter device, during the given clock cycle, generates an output that indicates the selections of the respective first interfaces for the second interfaces.

19 Claims, 7 Drawing Sheets

| | | | | | | | |
|---|---|---|---|---|---|---|---|
| $e_0$ | $e_1$ | $e_2$ | $e_3$ | $e_4$ | $e_5$ | $e_6$ | $e_7$ |
| 0 | 1 | 1 | 1 | 0 | 1 | 1 | 1 |
| 0 | 1 | 2 | 3 | 4 | 5 | 6 | 7 |

⬅ 410

| | | | | | | | |
|---|---|---|---|---|---|---|---|
| $e_1$ | $e_7$ | $e_6$ | $e_0$ | $e_3$ | $e_2$ | $e_5$ | $e_4$ |
| 1 | 1 | 1 | 0 | 1 | 1 | 1 | 0 |
| 0 | 1 | 2 | 3 | 4 | 5 | 6 | 7 |

⬅ 416

| | | | | | | | |
|---|---|---|---|---|---|---|---|
| $e_1$ | $e_7$ | $e_6$ | $e_0$ | $e_3$ | $e_2$ | $e_5$ | $e_4$ |
| $n_3$ | $n_1$ | | $n_0$ | | | | $n_2$ |
| 0 | 1 | 2 | 3 | 4 | 5 | 6 | 7 |

⬅ 420

| | | | | | | | |
|---|---|---|---|---|---|---|---|
| $e_0$ | $e_1$ | $e_2$ | $e_3$ | $e_4$ | $e_5$ | $e_6$ | $e_7$ |
| $n_0$ | $n_3$ | | | $n_2$ | | | $n_1$ |
| 0 | 1 | 2 | 3 | 4 | 5 | 6 | 7 |

MULTIPLE INPUT MULTIPLE OUTPUT ARBITER DEVICE

CROSS-REFERENCE TO RELATED APPLICATION

This disclosure claims the benefit of U.S. Provisional Patent Application No. 62/205,139, filed on Aug. 14, 2015, entitled "Parallel First Find," the disclosure of which is hereby expressly incorporated herein by reference in its entirety.

FIELD OF THE DISCLOSURE

The present disclosure relates generally to communication networks and, more particularly, to arbitration schemes used in network devices such as switches, routers, and edge devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like employ store and forward architectures in which received packets are stored in memory for subsequent transmission to desired destinations after processing. Some such network devices utilize multiple memory devices and/or multiple memory banks so that multiple packets, such as packets received via different ports of a network device, can be simultaneously written to respective ones of the memory device or memory banks. In a network device that utilizes multiple memory devices and/or multiple memory banks, an arbiter device may be used to arbitrate access to the multiple memory devices and/or multiple memory banks. Speed of the arbiter device affects how quickly arbitration decisions are made and accordingly, how quickly packets can be written to the memory.

SUMMARY

In an embodiment, a method for arbitrating connections between interfaces of one or more devices includes: determining, at an arbiter device during a given clock cycle, an ordered set corresponding to a plurality of first interfaces, the ordered set indicating whether each first interfaces of the plurality of first interfaces is available for selection for a second interface of a plurality of second interfaces during the given clock cycle; selecting, with the arbiter device during the given clock cycle, a respective available first interface, from the ordered set corresponding to the plurality of first interfaces, for each of the plurality of second interfaces, wherein selecting an available first interface for a particular one of the second interfaces is performed in parallel with and independently from selecting available first interfaces for other ones of the second interfaces; and generating, with the arbiter device during the given clock cycle, an output that indicates the selections of the respective first interfaces for the second interfaces.

In another embodiment, an arbiter device comprises one or more integrated circuits configured to: determine, during a given clock cycle, an ordered set corresponding to a plurality of first interfaces, the ordered set indicating whether each first interfaces of the plurality of first interfaces is available for selection for a second interface of a plurality of second interfaces during the given clock cycle; select, during the given clock cycle, a respective available first interface, from the ordered set corresponding to the plurality of first interfaces, for each of the plurality of second interfaces, wherein selecting an available first interface for a particular one of the second interfaces is performed in parallel with and independently from selecting available first interfaces for other ones of the second interfaces; and generate, during the given clock cycle, an output that indicates the selections of the respective first interfaces for the second interfaces.

In yet another embodiment, a network device comprises a plurality of ports, a memory device for storing packets received via the plurality of ports, the memory device having a plurality of memory banks, and a receive/write device configured to store in the memory device, packets that are received via the plurality of ports, the receive/write device having a plurality of first interfaces coupled to the plurality ports and a plurality of second interfaces coupled to the plurality of memory banks. The network device also comprises an arbiter device coupled to the receive/write device configured to: determine, during a given clock cycle, an ordered set corresponding to the plurality of first interfaces of the receive/write device, the ordered set indicating whether each first interfaces of the plurality of first interfaces is available for selection, during the given clock cycle, for a second interface of the plurality of second interfaces of the receive/write device; select, during the given clock cycle, a respective available first interface, from the ordered set corresponding to the plurality of first interfaces, for each of the plurality of second interfaces, wherein selecting an available first interface for a particular one of the second interfaces is performed in parallel with and independently from selecting available first interfaces for other ones of the second interfaces; generate, during the given clock cycle, an output that indicates the selections of the respective first interfaces for the second interfaces; and provide the output to the receive/write device. The receive/write device is configured to use the output provided by the arbiter device to transfer data received via the first interfaces to selected ones of the second interfaces for writing of the data to the corresponding ones of the memory banks coupled to the second interfaces.

BRIEF DESCRIPTION OF THE DRAWINGS

FIG. 4B is a diagram illustrating an example randomization technique used by the arbiter device of FIG. 2, according to an embodiment.

DETAILED DESCRIPTION

Example arbiter devices and methods for arbitrating connections between multiple inputs and multiple outputs of an arbiter device are described herein. For the purpose of illustrating teaching principles, in this disclosure examples of arbiter devices are described in the context of arbitrating access from multiple ports of a network device to a shared memory device for simultaneous writing of network packets received by the input ports to the shared memory device. It is noted however, in light of the disclosure and teachings herein, that similar methods and apparatus for arbitration are suitable wherever arbitration of access from multiple clients or slaves, such as multiple processors in a multi-processor computer, for example, to multiple shared resources, such as a shared memory that supports simultaneous access by the multiple processors, shared acceleration engines, or other shared resources, is required or desired. The described arbitration methodologies are not limited to use in communication network devices, but rather may be utilized in other suitable contexts as well.

Figure 1:
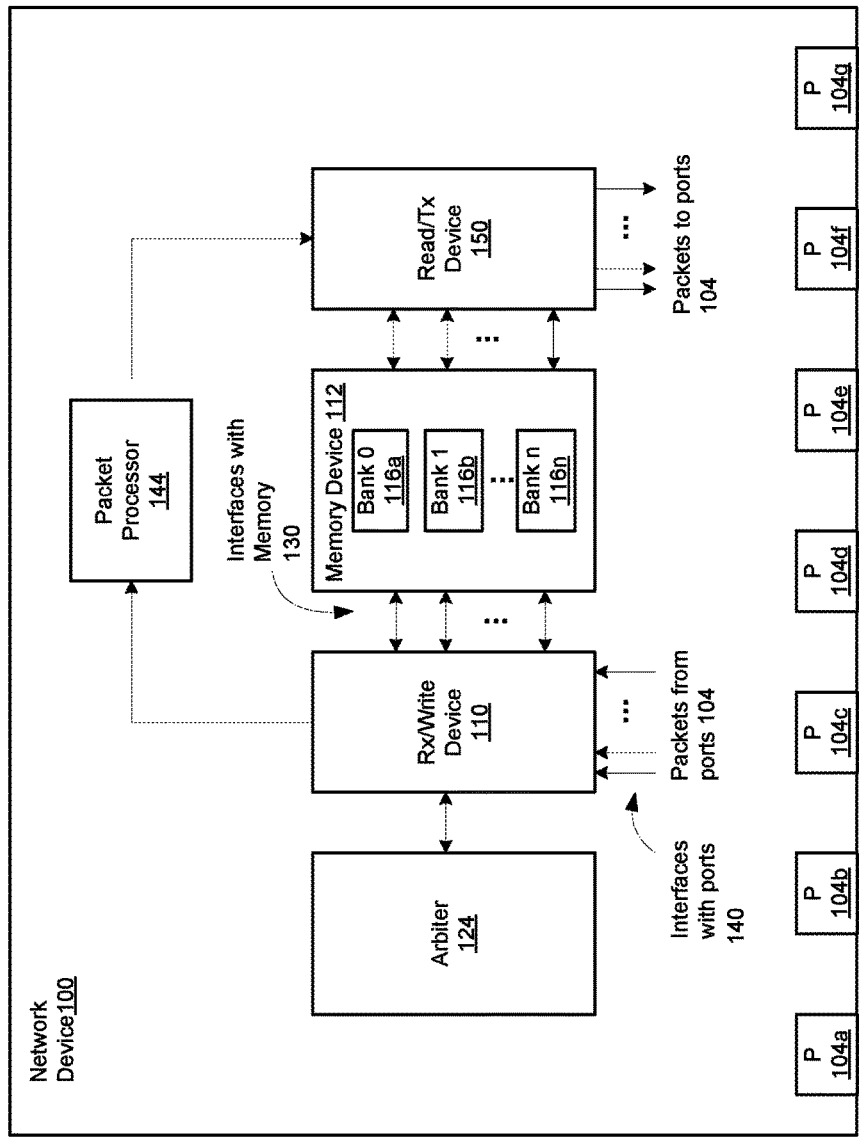
FIG. 1 is a block diagram of an example network device in which arbitration schemes of the present disclosure are utilized to arbitrate connections between a plurality of first interfaces and a plurality of second interfaces, according to an embodiment.

FIG. 1 is a block diagram of an example network device 100 in which arbitration schemes of the present disclosure are utilized to arbitrate connections between a plurality of first interfaces and a plurality of second interfaces, according to an embodiment. The network device 100 includes a plurality of ports 104 communicatively coupled to a plurality of network links (not shown). Although seven ports 104 are illustrated in FIG. 1, the network device 100 includes any suitable number of ports 104 in various embodiments. The network device 100 also includes a receive/write device 110 coupled to a packet memory device 112. In an embodiment, the packet memory device 112 is organized as a plurality of memory banks 116 that can be accessed simultaneously, for example for simultaneously writing multiple packets received via different ports 104 to different ones of the memory banks 116. Although three memory banks 116 are illustrated in FIG. 1, the network device 100 includes any suitable number of banks 116 in various embodiments.

In an embodiment, the receive/write device 110 includes multiple first interfaces 130 coupled to respective memory banks 116 in the memory device 112, and multiple second interfaces 140 coupled to respective ones of the ports 104. For ease of explanation, the first interfaces 130 are sometimes referred to herein as "memory interfaces" 130. However, the first interfaces 130 are other suitable interfaces coupled to suitable devices other than a memory device, in some embodiments. Similarly, for ease of explanation, the second interfaces 140 are sometimes referred to herein as "port interfaces" 140. However, the second interfaces 140 are other suitable interfaces coupled to suitable devices other ports, in some embodiments. "The receive/write device 110 is configured to write data (e.g., packets or data associated with packets) received via the ports 104 to the memory banks 116. In an embodiment, the receive/write device 110 is configured to simultaneously write data of multiple packets, received via respective ones of the ports 104, to respective ones of the memory banks 116. In an embodiment, the number of memory banks 116 in the packet memory device 112 is greater than the number of ports 104. Accordingly, the number of memory interfaces 130 in receive/write device 110 is greater than the number of port interfaces 140 in the in receive/write device 110, in this embodiment.

An arbiter device 124 is coupled to the receive/write device 110. In an embodiment, the arbiter device 124 selects, for respective port interfaces 140, respective memory interfaces 130 to be used by the receive/write device 110 for transferring data received via the port interfaces 140 to the selected respective memory interfaces 130, and writing the data to the corresponding respective memory banks 116 via the respective memory interfaces 130. In an embodiment, in any given clock cycle (e.g., clock cycle of the arbiter device 124), the arbiter device 124 selects a memory interface 130 for a port interface 140 by either (i) maintaining a selection made for the port interface 140 in a previous clock cycle that immediately preceded the given clock cycle (if a connection between the second interface and the selected first interface needs to be maintained for multiple clock cycles), or (ii) selecting a memory interface 130 that is different from the selection made for the port interface 140 in the previous clock cycle. Generally, if a selection of a memory interface 130 made, during a particular clock cycle, for a port interface 140 needs to be maintained for multiple clock cycles, for example for writing a relatively large amount of data (e.g., corresponding to a relatively large packet) to the corresponding memory bank 116, then this memory interface 130 will not be available for selection for other port interfaces 140 during the multiple clock cycles, in an embodiment. On the other hand, for the memory interfaces 130 that are available for selection in a given dock cycle, there are no restrictions as to which of these memory interfaces 130 can be selected for which of the port interfaces 140, in an embodiment. In other words, any memory interface 130 (e.g., coupled to any memory bank) that is available for selection in a given clock cycle can be selected for any port interface 140 (e.g., coupled to any port 104) for which a new selection is being made in the given clock cycle, in an embodiment. In an embodiment, the arbiter device 124, in any given clock cycle, selects respective memory interfaces 130 for respective port interfaces 140 in parallel with and independently from selecting, in the same clock cycle, respective memory interfaces 130 for other ones of the port interfaces 140. To make the selections, the arbiter device 124 generates, during each clock cycle, an ordered set of indications corresponding to the memory interfaces 130, the ordered set indicating memory interfaces 130 that are available for selection during the clock cycle. The ordered set includes a plurality of indications respectively corresponding to respective memory interfaces 130, and ordered according to a predetermined order of the memory interfaces 130, in an embodiment. For example, an indication corresponding to a first one of the memory interfaces 130 (e.g., interface 130 coupled to a first memory bank 116a) corresponds to the first index in the ordered set (e.g., index 0), an indication corresponding to a second one of the memory interfaces 130 (e.g., interface 130 coupled to a second memory bank 116b) corresponds to the second index in the ordered set (e.g., index 1), and so on, in an embodiment. Each indication in the ordered set indicates whether the corresponding memory interface 130 is, in the given clock cycle, available for selection for a port interface 140. Then, for each port interface 140, the arbiter device 124 selects an available memory interface 130 based on the ordered set of available memory interfaces 130, for example by moving through the ordered set in a predetermined direction to a next available memory interface 130 with respect to the memory interface 130 selected for the port interface 140 in the previous clock cycle, as will be explained in more detail bellow, in an embodiment. In an embodiment, because the number of memory interfaces 140 is greater than the number of interfaces 130, all necessary selections of new memory interfaces 130 for port interfaces 140 can be made even if some of the memory interfaces 130 are not available for selection in the given clock cycle.

Selecting respective memory interfaces 130 for respective port interfaces 140 in this manner allows the arbiter device 124 to generate the selections quickly, in a single clock cycle, for multiple ones (e.g., for all) of the port interfaces 140. Thus, the arbiter device 124 generates a new set of selections in each clock cycle, in at least some embodiments. The generated selections are generally fairly (e.g., at least substantially evenly) distributed among the port interfaces 140 over time (e.g., over multiple clock cycles), in at least some embodiments. Similarly, the generated selections are generally fairly (e.g., at least substantially evenly) distributed among the memory interfaces 130 over time (e.g., over multiple clock cycles), in at least some embodiments. In some embodiments, the arbiter device 124 randomizes selection of available memory interfaces 130 so as to more evenly distribute selection of memory interfaces 130, over time (e.g., over multiple clock cycles), for respective port interfaces 140, for example in situations of bursty inputs on some, but not all, of the port interfaces 140. Such randomization improves distribution of selections of available memory interfaces 130 for respective port interfaces 140, over time, particularly when the number of memory interfaces 130 is significantly greater than the number of port interfaces 140, in an embodiment. Thus, the number of memory interfaces 130 in the receive/write device 110 (and, accordingly the number of memory banks 116 in the packet memory device 112) is significantly greater (e.g., 5 times greater, 10 times greater, 50 times greater, 100 timer greater, etc.) than the number of ports interfaces 140 in the receive/write device 110 (and, accordingly the number of ports 104 in the network device 100), in at least some embodiments. Various arbitration techniques used by the arbiter device 124 in some embodiments are described in more detail below with respect to FIGS. 2-5.

In an embodiment, the packets are also provided to a packet processor 144 for processing of the packets. In some embodiments, packet descriptors are generated for the packets, and the packet descriptors, rather than the packets themselves, are provided to the packet processor 144. For example, the receive/write device 10 is configured to generate a packet descriptor associated with a packet to be processed, in an embodiment. In other embodiments, another suitable device or module within the network device 100 is configured to generate a packet descriptor associated with a packet to be processed. The packet descriptor contains information that the packet processor 144 utilizes to process the associated packet. In some embodiments, the packet descriptor includes an address, a pointer, or other suitable indicator of a location in the packet memory 112 at which the associated packet is stored. In some embodiments, the receive/write client device 120 determines the location in the packet memory 112 at which the associated packet is to be stored. In some embodiments, the indicator of the location in the packet memory 112 at which the associated packet is stored is received from the packet memory 112 in response to a write request to the memory 112.

The packet processor 144 is configured to process a packet descriptor (and in some cases header information not included in the descriptor) to determine one or more of the ports 104 to which the packet associated with the packet descriptor (or header information) is to be forwarded. In an embodiment, the packet processor 144 includes or is coupled to a forwarding database (not shown) that stores forwarding information (e.g., port information) associated with addresses (e.g., media access control (MAC) addresses, Internet Protocol (IP) addresses, etc.) and/or other suitable information. In an embodiment, the packet processor 144 is configured to utilize information in a header of a packet or in a packet descriptor (and/or in some cases header information not included in the descriptor) to look up information in the forwarding database that indicates one or more ports 104 to which an associated packet is to be forwarded. In some embodiments, the processor 144 is configured to store in the packet descriptor an indication(s) of the one or more ports 104 to which the associated packet is to be forwarded.

Packets or packet descriptors processed by the packet processor 144 are provided to a read/transmit device 150. The read/transmit device 150 is configured to utilize a location indicator in a packet descriptor to read data corresponding to the associated packet from the packet memory 112. The read/transmit device 150 then provides the packet (read from the packet memory 112) to a port 104, indicated by the associated packet descriptor, for transmission via the port 104, in an embodiment.

Figure 2:
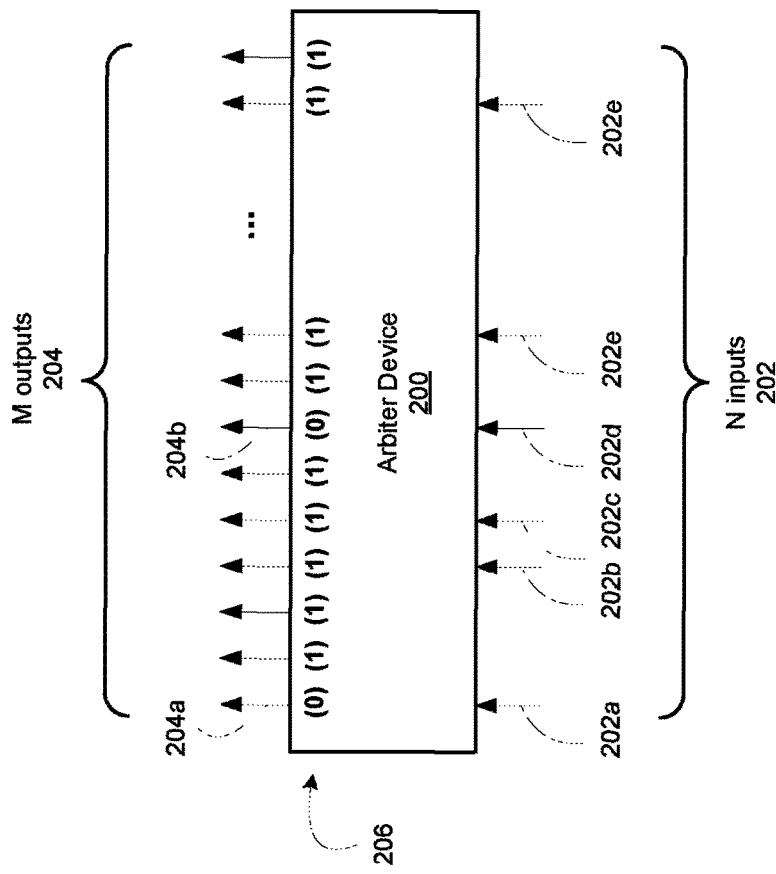
FIG. 2 is a diagram of an arbiter device used with the network device of FIG. 1, according to an embodiment.

FIG. 2 is a diagram of an arbiter device 200, according to an embodiment. In an embodiment, the arbiter device 200 is used to arbitrate connections between multiple first interfaces and multiple second interfaces of a controller device. In an embodiment, the arbiter device 200 corresponds to the arbiter device 124 of FIG. 1. In this embodiment, the arbiter device 200 is used to arbitrate connections between the memory interfaces 130 and the port interfaces 140 of the receive/write device 110. In another embodiment, a suitable arbiter device different from the arbiter device 200 is used to arbitrate connections between the memory interfaces 130 and the port interfaces 140 of the receive/write device 110. Similarly, the arbiter device 200 is used to arbitrate between first interfaces and second interfaces of suitable devices different from the receive/write device 110. In some embodiments, the arbiter device 200 is used with a network device different from the network device 100, or is used with a suitable device other than a network device. Merely for explanatory purposes, the arbiter device 200 will be described with reference to FIG. 1.

The arbiter device 200 is illustrated as having N inputs 202 and M outputs 204, where N and M are integers greater than 1. The number of inputs N is less than the number of output M (N<M), in an embodiment. In some embodiments, the number of inputs N is significantly less (e.g., 5 times less, 10 times less, 50 times less, 100 timer less, etc.), than the number of outputs M (N<<M). In an embodiment, the inputs 202 correspond to the port interfaces 140 of the receive/write device 110, and the outputs 204 correspond to the memory interfaces 130 of the receive/write device 110. The arbiter device 200 arbitrates connections between respective inputs 202 and respective outputs 204 by selecting respective outputs 204 for respective inputs 202, where different selections are generally made for at least some of the inputs 202 in consecutive clock cycles. In an embodiment, in any given clock cycle, each output 204 is either (i) available for selection for a new input 202 or (ii) is not available for selection for a new input 202. For example, an output 204 is not available for selection if a connection between an input 202 and the output 204 that was made in a previous clock cycle needs to still be maintained in the current clock cycle. For example, the connection between the input 202 and the output 204 needs to be maintained for multiple clock cycles because it may take multiple clock cycles to transfer packet data (e.g., of a relatively large packet) from the corresponding memory interface 130 to the corresponding memory bank 116, in an embodiment. In an embodiment, the arbiter device, in any given clock cycle, generates an output indicating a mapping between inputs 202 and outputs 204 that corresponds to selections made by the arbiter 200 during the given clock cycle, including selections (if any) that were maintained from a previous clock cycle. Generally, in an embodiment, the arbiter device 200 generates, in any given clock cycle, an output that indicates a respective output M mapped to each of the inputs N, with a number of outputs (M−N) being left unselected, and available for selection in the next clock cycle.

In an embodiment, in any given clock cycle, the arbiter 200 generates an ordered set 206 corresponding to the outputs 204. The ordered set 206 includes a respective indication corresponding to each of the outputs 204 that indicates whether the output 204 is available for selection in the given clock cycle. For example, in an embodiment, the arbiter device 200 generates an ordered set (e.g., an ordered array or a vector) of bits 206, where each bit in the ordered set of bits 206 corresponds to a particular one of the outputs 204 and is set to a logic one (1) if the particular output 204 is available for selection, or to a logic zero (0) if the particular output 204 is not available for selection, or vice versa, in an embodiment. Then, the arbiter device 200 selects, based on the ordered set 206, an output 204 for each input 202 for which a selection made in the previous dock cycle need not be maintained in the current clock cycle. For example, the arbiter device 200 determines or finds, for each of the inputs 202 for which the selection made in the previous clock cycle need not be maintained, which next bit in the ordered set 206 is set to a logic one when moving through the ordered set 206 from most significant bit (MSB) to least significant bit (LSB), or from left to right, beginning at the bit corresponding to the current selection for the input 202, in an embodiment. As another example, the arbiter device 200 determines or finds, for each of the inputs 202 for which the selection made in the previous clock cycle need not be maintained, which next bit in the ordered set 206 is set to a logic one when moving through the ordered set 206 in the direction from LSB to MSB, or from right to left, beginning at the bit corresponding to the current selection for the input 202, in an embodiment.

The arbiter device 200 then shifts each of the inputs 202 for which a new selection is made to the output 204 corresponding to the bit determined or found for the input 202. As will be explained in more detail below with respect to FIGS. 4A-4B, in some embodiments, the arbiter device 200 randomizes selection by shuffling the order of bits (moving the bits to other indices) in the set 206 prior to making the selections based on the shuffled set 206 to generate a shuffled output set. The arbiter device 200 then reshuffles the output vector to restore the order of the outputs 204 in the vector, and generates the output mapping based on the unshuffled output set, in such embodiments.

FIGS. 3A-3F are diagrams illustrating operation of the arbiter device 200 over several consecutive clock cycles, according to an embodiment. In FIGS. 3A-3F, inputs 302 correspond to the inputs 202 of the arbiter device 200 and outputs 304 correspond to the outputs 204 of the arbiter device 200. Each of FIGS. 3A-3F corresponds to a particular one of the several consecutive clock cycles. The inputs 302 and the outputs 304 in each of FIGS. 3A-3F are aligned to illustrate selections of the outputs 304 for the inputs 302 made by the arbiter device 200 in the corresponding clock cycle. A set of indications 306 is an ordered set that includes a respective indication for each output 304, to indicate whether the output 304 is available for selection in the next clock cycle. Thus, the set of indications 306 corresponds to the ordered 206, in an embodiment. A set of indications 310 includes a respective indication (e.g., a respective counter) for each of the inputs 302, where each indication 302 is set to indicate a remaining number of consecutive clock cycles for which a selection for the corresponding input 302 needs to be maintained, in an embodiment.

Figure 3A:
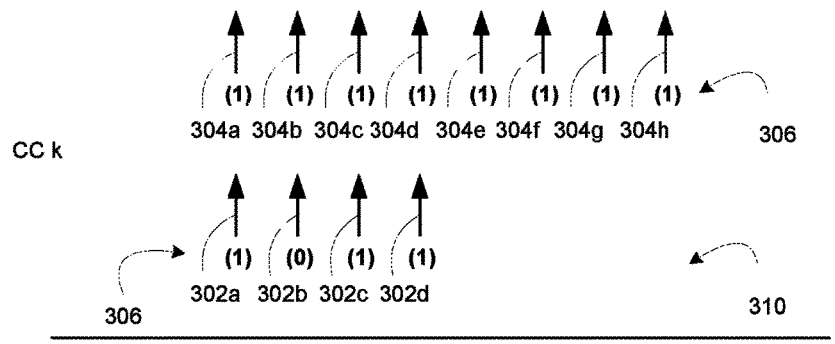
FIGS. 3A-3F are diagrams illustrating operation of the arbiter device of FIG. 2 over several consecutive clock cycles, according to an embodiment.

Referring first to FIG. 3A, during a clock cycle k, the arbiter device 200 makes the following selections: an output 304a is selected for an input 302a, an output 304b is selected form an input 302b, an output 304c is selected for an input 302c, and an output 304d is selected for an input 302d. For each of the inputs 302a, 302c and 302d, the selection made during the clock cycle k needs to be maintained for only one dock cycle as indicated by a (1) setting of indications corresponding to the inputs 302a, 302c and 302d in the set of indications 310, while the selection made for the input 302b is not needed (e.g., the interface 130 corresponding to the input 302b does not have any data to be transferred) as indicated by a (0) setting of the indication corresponding to the inputs 302b in the set of indications 310. In an embodiment, the arbiter device 200 makes a new selection of an output 204 for every input 202 for which a previous selection need not be maintained. Thus, the arbiter device 200 makes a new selection for an input 202 even if a selection for the input 202 is not needed during a particular clock cycle, in an embodiment.

With continued reference to FIG. 3A, because no selection made during the clock cycle k needs to be maintained for more than one clock cycle, each of the outputs 304 are available for selection in the next clock cycle, as indicated by a logic 1 setting of each indication in the set 306.

Figure 3B:
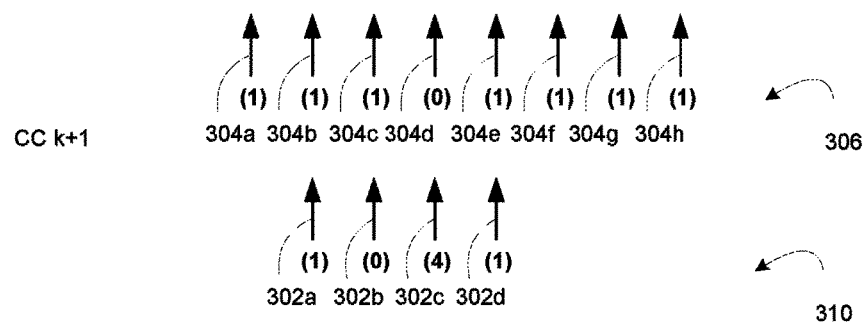

Referring now to FIG. 3B, during the next consecutive clock k+1, the arbiter device 200 shifts each of the inputs 302 by one output to the right because, for each of the inputs 302, the next output to the right from the selection made for the input 302 during the clock cycle k is available for selection during the clock cycle k+1. As indicated by a (4) setting for the indication corresponding to the input 302c in the set of indications 310, the selection made for the input 302c during the clock cycle k+1 needs to be maintained for four consecutive clock cycles. Accordingly, the arbiter device de-asserts (e.g., sets to logic zero (0)), an indication corresponding to the output 304d in the set of indications 306 to indicate that this output is not available for selection in the next clock cycle. The remaining indications in the set 310 remain asserted (e.g., sets to logic one (1)) because the remaining outputs 304 are available for selection during the next clock cycle.

Figure 3C:
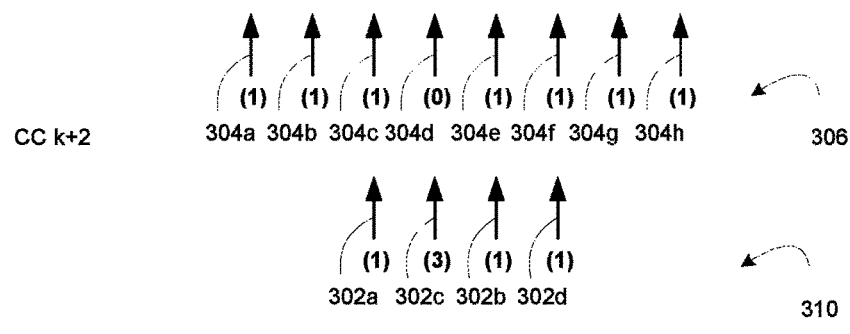

Referring now to FIG. 3C, during the next consecutive clock cycle k+2, the arbiter device 200 maintains the selection (e.g., makes the same selection) made for input 302c during the clock cycle k+1. Also, the arbiter device 200 decrements the indication (e.g., counter) corresponding to the input 302c in the set of indications 310 by one (e.g., sets to 3) to indicate that the current selection for the input 302c needs to be maintained for three additional clock cycles, in an embodiment. Further, the arbiter device 200 shifts selections for each of the inputs 302a, 302b, and 302d to a respective next available output 304 with respect to the selection made for the corresponding input 302a, 302b, and 302d during the clock cycle k+1. Thus, for example, the input 302a is shifted by one output to the right to the output 304c because the output 304c is the next available output to the right from the output 304b which was selected for the input 302a in the previous clock cycle k±1. Similarly, the input 302d is shifted by one output to the right to the output 304*f* because the output 304*f* is the next available output to the right from the output 304*e* which was selected for the input 302*h* in the previous clock cycle k+1. On the other hand, because the output 304*d* is not available for selection during the clock cycle k+2, selection for the input 302*b* skips the output 304*d* and instead selects the output 304*e*, which is the next available output to the right from the output 304*c* which was selected for the input 302*b* in the previous clock cycle k+1.

Figure 3D:
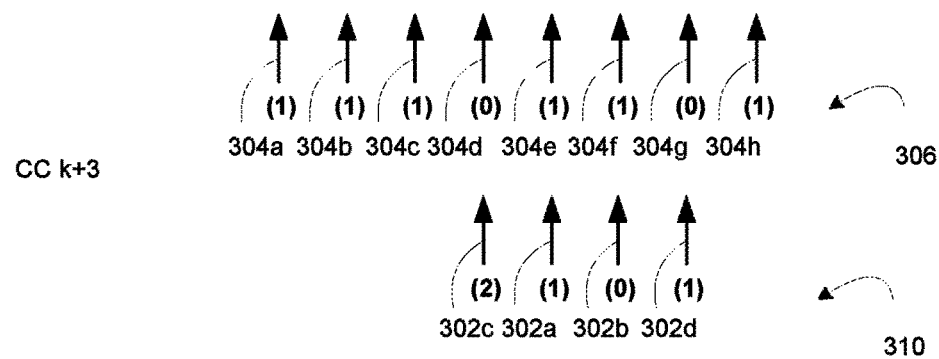

Referring now to FIG. 3D, during the next consecutive clock cycle k±3, the arbiter device 200 still maintains the selection (e.g., makes the same selection) that was made for input 302*c* during the clock cycle k+2, Also, the arbiter device 200 decrements the indication corresponding to the input 302*c* in the set of indications 310 by one (e.g., sets to 2) to indicate that the current selection for the input 302*c* needs to be maintained for two additional clock cycles. Further, the arbiter device 200 shifts selections for each of the inputs 302*a*, 302*b*, and 302*d* to a respective next available output 304 with respect to the selection made for the corresponding input 302*a*, 302*b*, and 302*d* during the clock cycle k+2 in the same manner as described with respect to FIG. 3C.

Figure 3E:
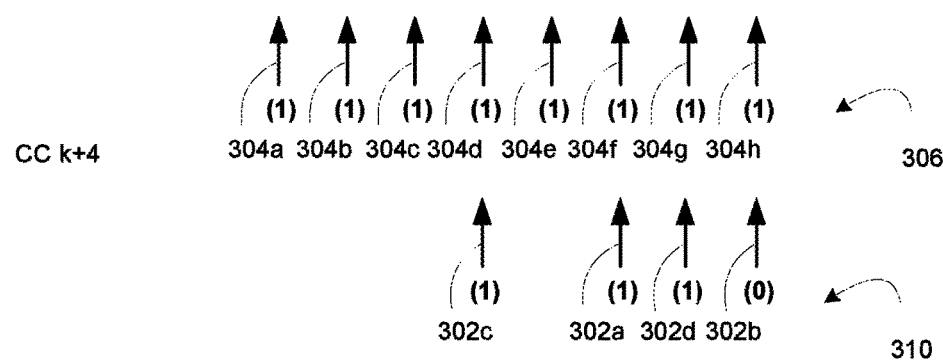

Referring now to FIG. 3E, during the next consecutive clock cycle k+4, the arbiter device 200 still maintains the selection (e.g., makes the same selection) that was made for input 302*c* during the clock cycle k+3. Also, the arbiter device 200 decrements the indication corresponding to the input 302*c* in the set of indications 310 by one to (e.g., sets to 1) to indicate that the current selection for the input 302*c* needs to be maintained for only one additional clock cycle (the current clock cycle). Further, the arbiter device 200 asserts (e.g., sets to logic one) the indication corresponding to the output 304*d* in the set of indications 306 to indicate that the output 304*d* is now available for selection in the next clock cycle. Further, the arbiter device 200 shifts selections for each of the inputs 302*a*, 302*b*, and 302*d* to a respective next available output 304 with respect to the selection made for the corresponding input 302*a*, 302*b*, and 302*d* during the clock cycle k+3 in the same manner as described with respect to FIG. 3C.

Figure 3F:
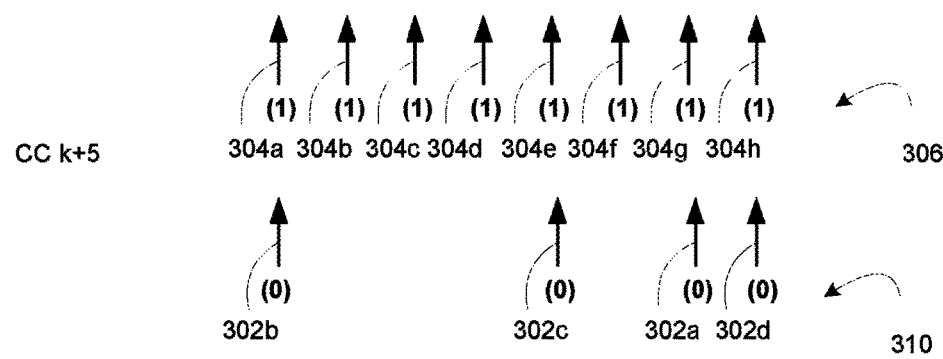

Referring now to FIG. 3F, during the next consecutive clock cycle k+5, the input 302*c* is now eligible for selection of a new output 304 along with selections of the outputs 304 for each of the inputs 302*a*, 302*b*, and 302*d*. Accordingly, the arbiter device 200 shifts selections for each of the inputs 302*a*, 302*b*, 302*c*, and 302*d* to a respective next available output 304 with respect to the selection made for the corresponding input 302*a*, 302*b*, 302*c*, and 302*d* during the clock cycle k+4 in the same manner as described with respect to FIG. 3C. As illustrated in FIG. 3F, selection of an output for the input 302*b* has wrapped around in the around the ordered set 306 because the last output 304 (304*h*) in the ordered set 306 was selected for the input 302*d* during the previous clock cycle k+4.

Figure 4A:
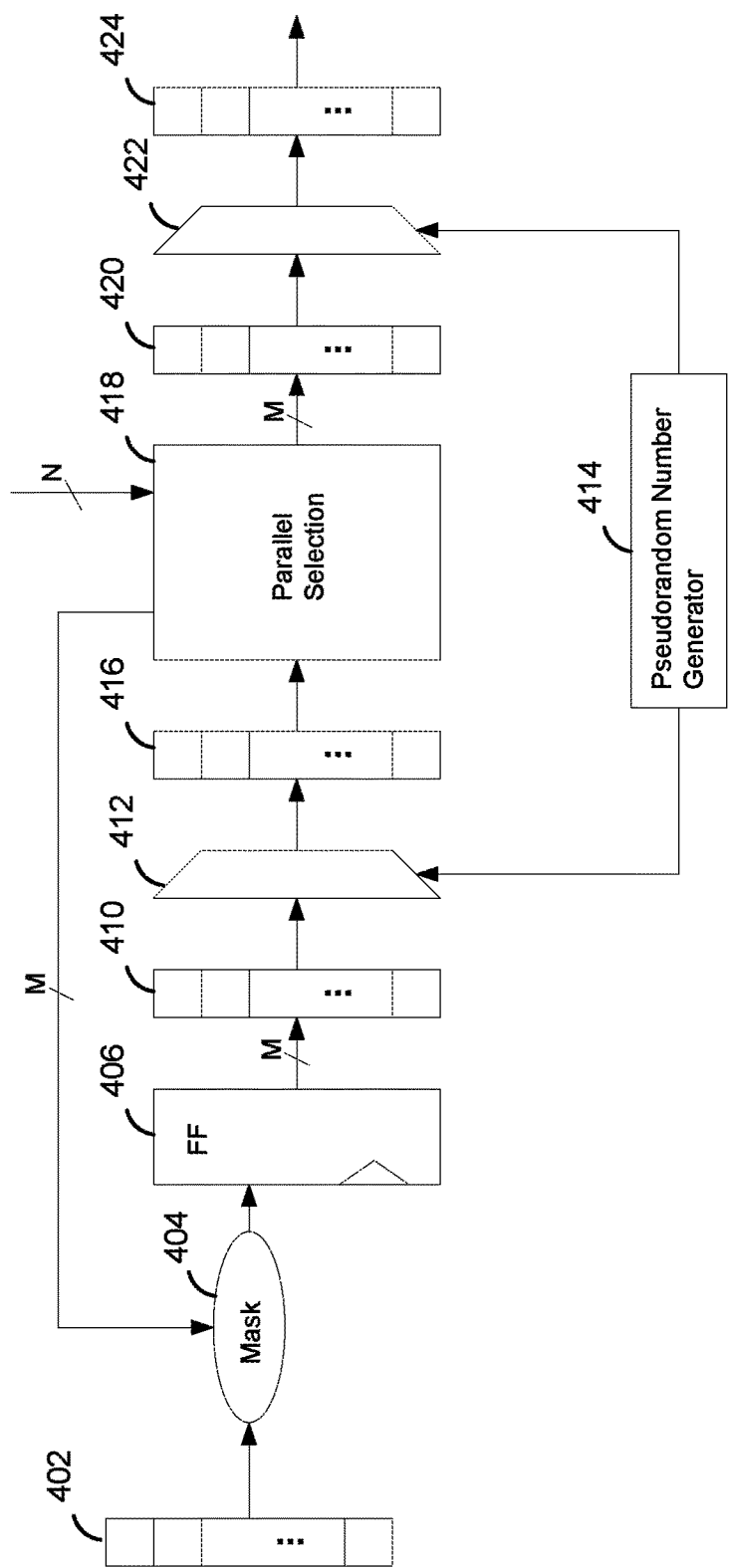
FIG. 4A is a block diagram of an example implementation of the arbiter device of FIG. 2, according to an embodiment.

FIG. 4A is a block diagram of an example implementation of the arbiter device 200, according to an embodiment. The arbiter 200 includes a flip flop 406 that applies a mask 404 to an initial set of available outputs 402 (e.g., all ones) to mask out the outputs 402 that are not available for selection in the current clock cycle. The output of the flip flop 406 is a set 410 that indicates, for each output, whether or not the output is available for selection during the current clock cycle. In an embodiment, the mask 404 is generated based on selections made in the previous clock cycle that immediately preceded the current clock cycle. Accordingly, if any selections that were made during the previous clock cycle need to be maintained in the current clock cycle, the corresponding outputs will be masked and therefore unavailable for selection during the current clock cycle, in an embodiment.

With continued reference to FIG. 4A, a multiplexer 412 operates on the set 410 to rearrange the order of elements in the set 410 according to a set of pseudorandom numbers provided to the multiplexer 412 by a pseudorandom number generator 414. For example, the multiplexer 412 moves the elements in the set 412 to new indices corresponding to the pseudorandom numbers generated by the pseudorandom number generator 414. Accordingly, the multiplexer 412 generates a shuffled ordered set 416 that contains elements of the set 410 with the order of the elements shuffled with respect to the ordered set 410. Referring briefly to FIG. 4B, the set 410 includes eight elements e, corresponding to eight outputs 204, indexed 0 to 7, in an example embodiment. In other embodiments, the set 410 includes other numbers of elements corresponding to other numbers of outputs 204. Each of the elements e in the set 410 is set to a logic one (1) to indicate that the corresponding output 204 is available for selection in the current clock cycle, or is set to a logic zero (0) to indicate that the corresponding output 204 is not available for selection in the current clock cycle, or vice versa, in an embodiment. As also illustrated in FIG. 4B, the set 416 generated by the multiplexer 412 includes the elements of the set 410 that are arranged in an order different from the order in the set 410. For example, as illustrated in FIG. 4B, the element $e_0$ at the index 0 in the set 410 is moved to the index 3 in the set 416, the element $e_1$ at index 1 in the set 410 is moved to the index 0 in the set 416, and so on, in the illustrated embodiment.

Referring back to FIG. 4A, the shuffled set 416 is provided to a parallel selection processor 418. The parallel selection processor 418 also receives indications corresponding to the inputs 202 that indicate, for example, number of clock cycles for which respective inputs 202 need to maintain connections to selected outputs 204. In an embodiment, the parallel selection processor 418 also receives indications of selections made in the previous clock cycle. The parallel selection processor 418 operates on the shuffled ordered set 416 to make a selection of a respective output 204 for each of the inputs 202, in an embodiment. The parallel selection processor 418 selects a respective output 204 for each input 202 in parallel with and independently from selecting other ones of the outputs 204 for other ones of the inputs 202, in an embodiment. For example, the parallel find processor 418 makes a selection of an output 204 for each of the inputs 202 as described above with respect to FIGS. 3A-3E, in an embodiment. In an embodiment, for each input 202 that is eligible for selection during the current clock cycle, the parallel selection processor 418 implements a "find first set" algorithm to find, in the ordered set 416, a next "set" (e.g., set to logic 1) bit in a predetermined direction, such as from MSB to LSB, left to right, LSB to MSB, or right to left, for example, with respect to the output 204 that was selected for the input 202 in the previous clock cycle. In other embodiments, other suitable selection schemes are used.

The parallel selection processor 418 generates a shuffled output set 420 that indicates selections of respective outputs 204 for respective inputs 202. A multiplexer 422 rearranges the order of elements in the shuffled output set 420 to restore the original order corresponding to the order of indications in the set 410, in an embodiment. In an embodiment, to restore the order, the multiplexer 422 operates on the shuffled output set 420 using the same set of pseudorandom numbers that were used to rearrange the order of elements in the set 410 by the multiplexer 412. The multiplexer 422 generates an unshuffled output set 424. Referring again to FIG. 4B, continuing with the example embodiment with eight outputs 204, the set 420 includes eight elements e, corresponding to eight outputs 204, indexed 0 to 7, in an example embodiment. Each of the elements e in the set 420 indicates a mapping n between the corresponding output 204 and an input 202 for which the output 204 was selected in the current clock cycle, or indicates, for example by an absence of an indication of a mapping for an output 204, that the output 204 was not selected in the current clock cycle. The order of the elements in the set 420 corresponds to the order of elements in the set 416. With continued reference to FIG. 4B, the set 424 includes the elements of the set 420 that are re-arranged back to the order of the elements in the set 410. For example, as illustrated in FIG. 4B, the element $e_n$ is moved back to the index 0 corresponding to the element $e_0$ in the set 410, the element $e_1$ is moved back to the index 1 corresponding to the at index 1 in the set 410, and so on, in the illustrated embodiment.

Referring back to FIG. 4A, the unshuffled output set 424 corresponds to the output of the arbiter device 200, in an embodiment. In another embodiment, the arbiter device 200 generates an output based on the unshuffled output set 424.

Figure 5:
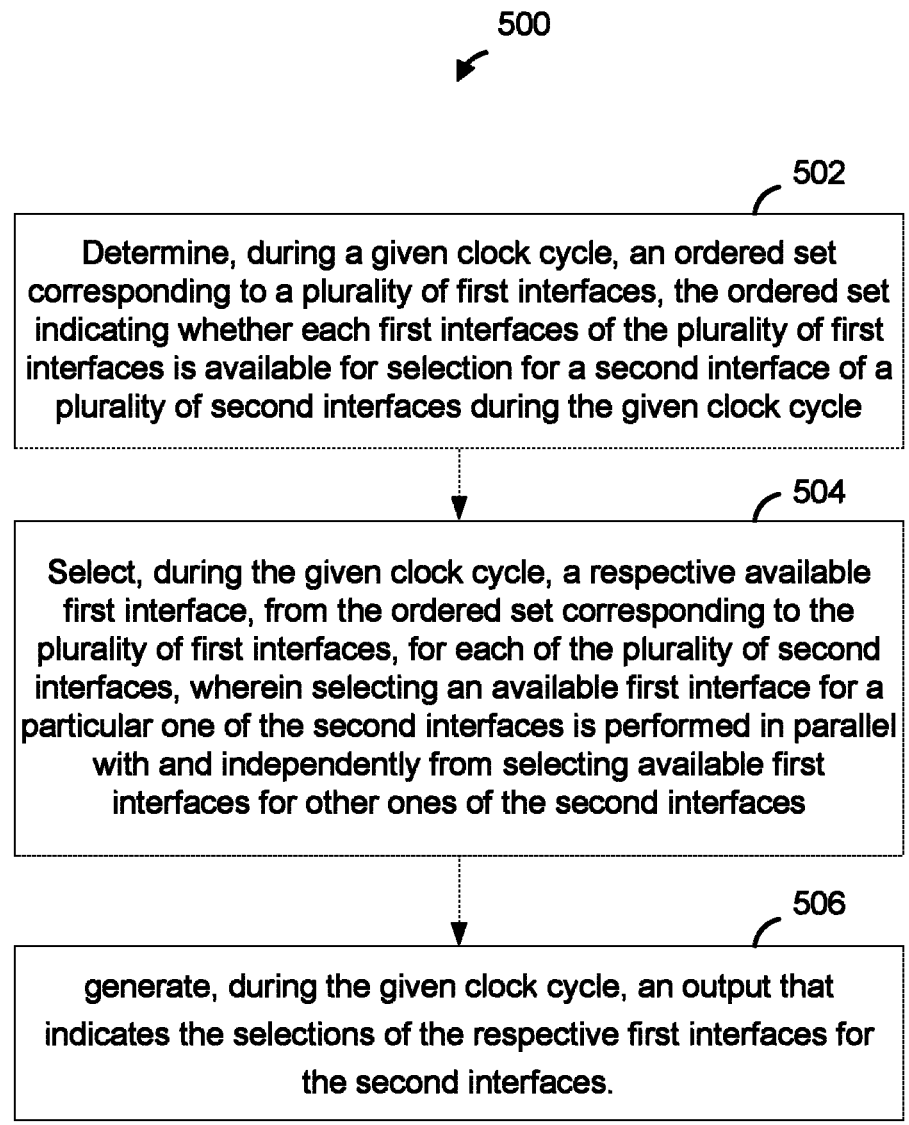
FIG. 5 is a flow diagram illustrating an example method for arbitrating connections between interfaces of one or more devices, according to an embodiment.

FIG. 5 is a flow diagram illustrating an example method 500 for arbitrating connections between interfaces of one or more devices, according to an embodiment. In an embodiment, the arbiter device 124 of the network device 100 of FIG. 1 implements the method 500 to arbitrate connections between interfaces 130 and output interfaces 140 of the receive/write device 110. Thus, the method 500 is described with reference to FIG. 1 merely for explanatory purposes. In other embodiments, the method 500 is implemented by another suitable network device, or is implemented by an arbiter device operating in an environment other than a network device.

At block 502, during a given clock cycle (e.g., clock cycle of the arbiter device 124) an ordered set corresponding to a plurality of first interfaces is determined. The ordered set corresponding to the plurality of first interfaces indicates whether each first interface of the plurality of first interfaces is available for selection for a second interface of a plurality of second interfaces during the given clock cycle. In an embodiment, the plurality of first interfaces are the interfaces 140 of the receive/write device 110, and the second set of interfaces are the interfaces 130 of the receive/write device 110. In other embodiments, the first interfaces and the second interfaces are interfaces of devices different from the receive/write device 110. In an embodiment, the ordered set is a set of binary numbers indexed according to an order of the first interfaces. In this embodiment, generating the ordered set comprises setting each bit in the ordered set to a first binary value (e.g., a logic 1) to indicate that the corresponding first interface is available for selection in the given clock cycle or to a second binary value (e.g., a logic 0) to indicate that the corresponding first interface is not available for selection in the given clock cycle. In other embodiments, other suitable indications of whether each first interface of the plurality of first interfaces is available for selection during the given clock cycle.

At block 504, during the given clock cycle, a respective available first interface is selected for each second output of the plurality of second outputs. In an embodiment, selecting an available first interface is performed in parallel with and independently from selecting available first interfaces for other ones of the second interfaces. In at least some embodiments and scenarios, selection of a first interface for a second interface comprises, for any given second interface, either maintaining a selection made for the second interface in a previous clock cycle that immediately preceded the given clock cycle (if a connection between the second interface and the selected first interface needs to be maintained for multiple clock cycles), or selecting a new first interface. In an embodiment, selecting a respective new first interface for each second interface for which a new selection is made during the given dock cycle is made by determining, for each of the second interfaces, a next available first interface when moving through the ordered set generated at block 502 in a predetermined direction (e.g., MSB to LSB, left to right, LSB to MSB, or right to left) from a first interface that was selected for the second interface during the previous clock cycle that immediately preceded the given clock cycle.

At block 506, an output is generated. The output indicates the selections of the first interfaces made for the second interfaces at block 504. In an embodiment, the output comprises am ordered output set corresponding to the first interfaces, where ordered output set indicates mappings between the respective selected first interfaces and the second interfaces for which the first interfaces were selected at block 506. In another embodiment, other suitable output formats are used. In an embodiment, the output is provided to the receive/write device 110. The receive/write device 110 utilizes the output to transfer data received via the first interfaces to the selected ones of the second interfaces for writing of the data to the corresponding ones of the memory banks 116 coupled to the second interfaces, in an embodiment.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for arbitrating connections between interfaces of one or more devices, the method comprising:
   determining, at an arbiter device during a given clock cycle, an ordered set corresponding to a plurality of first interfaces, the ordered set indicating whether each first interfaces of the plurality of first interfaces is available for selection for a second interface of a plurality of second interfaces during the given clock cycle;

selecting, with the arbiter device during the given clock cycle, a respective available first interface, from the ordered set corresponding to the plurality of first interfaces, for each of the plurality of second interfaces, wherein selecting an available first interface for a particular one of the second interfaces is performed in parallel with and independently from selecting available first interfaces for other ones of the second interfaces; and generating, with the arbiter device during the given clock cycle, an output that indicates the selections of the respective first interfaces for the second interfaces.

2. The method of claim 1, wherein selecting the respective available first interface from the ordered set corresponding to the plurality of first interfaces includes, determining, for a particular one of the second interfaces, a next available first interface when moving through the ordered set, in a predetermined direction, from a first interface that was selected for the particular second interface in a previous clock cycle that immediately preceded the given clock cycle.

3. The method of claim 1, wherein the ordered set corresponding to the plurality of first interfaces is an array of binary numbers indexed according to an order of first interfaces, and wherein each binary number is set to (i) a first value to indicate that a corresponding first interface is available for selection or (ii) a second value to indicate that the corresponding first interface is not available for selection.

4. The method of claim 1, wherein generating the ordered set corresponding to the plurality of first interfaces includes masking first interfaces that are not available for selection for new second interfaces in the given clock cycle, wherein masking is at least in part based on selections made in a previous clock cycle that immediately precedes the given clock cycle.

5. The method of claim 1, further comprising
prior to selecting the respective available first interface, rearranging, with the arbiter device during the given clock cycle, an original order of elements of the ordered set corresponding to the plurality of first interfaces to generate a shuffled ordered set corresponding to the plurality of first interfaces, and
wherein selecting the respective available first interface for each second interface comprises selecting the respective first interface from the shuffled ordered set corresponding to the plurality of first interfaces.

6. The method of claim 5, wherein generating the output that indicates the selections of the respective first interfaces for the second interfaces includes
generating a shuffled output set that indicates the selections, and
rearranging the shuffled output set according to the original order of elements of the ordered set corresponding to the plurality of first interfaces.

7. The method of claim 6, wherein
rearranging the original order of elements of the ordered set corresponding to the plurality of first interfaces comprises moving each element of the ordered set to an index generated by a pseudorandom number generator, and
rearranging the shuffled output set according to the original order of elements of the ordered set corresponding to the plurality of first interfaces comprises moving each element of the shuffled output set to the index generated by the pseudorandom number generator.

8. The method of claim 6, wherein generating the output that indicates the selections of the respective first interfaces for the second interfaces comprises generating an ordered output set corresponding to the plurality of first interfaces, wherein the ordered output set indicates correspondences between the second interfaces and the respective first interfaces selected for the second interfaces.

9. An arbiter device, comprising:
one or more integrated circuits configured to
determine, during a given clock cycle, an ordered set corresponding to a plurality of first interfaces, the ordered set indicating whether each first interfaces of the plurality of first interfaces is available for selection for a second interface of a plurality of second interfaces during the given clock cycle;
select, during the given clock cycle, a respective available first interface, from the ordered set corresponding to the plurality of first interfaces, for each of the plurality of second interfaces, wherein selecting an available first interface for a particular one of the second interfaces is performed in parallel with and independently from selecting available first interfaces for other ones of the second interfaces; and
generate, during the given clock cycle, an output that indicates the selections of the respective first interfaces for the second interfaces.

10. The arbiter device of claim 9, wherein the one or more integrate circuits are configured to determine, for a particular one of the second interfaces, a next available first interface when moving through the ordered set, in a predetermined direction, from a first interface that was selected for the particular second interface in a previous clock cycle that immediately preceded the given clock cycle.

11. The arbiter device of claim 9, wherein the ordered set corresponding to the plurality of first interfaces is an array of binary numbers indexed according to an order of first interfaces, and wherein each binary number is set to (i) a first value to indicate that a corresponding first interface is available for selection or (ii) a second value to indicate that the corresponding first interface is not available for selection.

12. The arbiter device of claim 9, wherein the one or more integrated circuits is are configured to generate the ordered set corresponding to the plurality of first interfaces at least by masking first interfaces that are not available for selection for new second interfaces in the given clock cycle, wherein masking is at least in part based on selections made in a previous clock cycle that immediately precedes the given clock cycle.

13. The arbiter device of claim 9, wherein the one or more integrated circuits are further configured to
prior to selecting the respective available first interface, rearrange an original order of elements of the ordered set corresponding to the plurality of first interfaces to generate a shuffled ordered set corresponding to the plurality of first interfaces, and
select the respective available first interface for each second interface from the shuffled ordered set corresponding to the plurality of first interfaces.

14. The arbiter device of claim 9, wherein the one or more integrated circuits are configured to generate a shuffled output set that indicates the selections, and rearrange the shuffled output set according to the original order of elements of the ordered set corresponding to the plurality of first interfaces to generate an unshuffled output set.

15. The arbiter device of claim 14, wherein the one or more integrated circuits are configured to generate the output that indicates the selections of the respective first interfaces for the second interfaces at least by generating an ordered output set corresponding to the plurality of first interfaces, wherein the ordered output set indicates correspondences between the second interfaces and the respective first interfaces selected for the second interfaces.

16. A network device, comprising
a plurality of ports;
a memory device for storing packets received via the plurality of ports, the memory device having a plurality of memory banks;
a receive/write device configured to store in the memory device, packets that are received via the plurality of ports, the receive/write device having a plurality of first interfaces coupled to the plurality ports and a plurality of second interfaces coupled to the plurality of memory banks; and
an arbiter device coupled to the receive/write device configured to
  determine, during a given clock cycle, an ordered set corresponding to the plurality of first interfaces of the receive/write device, the ordered set indicating whether each first interfaces of the plurality of first interfaces is available for selection, during the given clock cycle, for a second interface of the plurality of second interfaces of the receive/write device;
  select, during the given clock cycle, a respective available first interface, from the ordered set corresponding to the plurality of first interfaces, for each of the plurality of second interfaces, wherein selecting an available first interface for a particular one of the second interfaces is performed in parallel with and independently from selecting available first interfaces for other ones of the second interfaces; and
  generate, during the given clock cycle, an output that indicates the selections of the respective first interfaces for the second interfaces; and
  provide the output to the receive/write device;
wherein the receive/write device is configured to use the output provided by the arbiter device to transfer data received via the first interfaces to selected ones of the second interfaces for writing of the data to the corresponding ones of the memory banks coupled to the second interfaces.

17. The network device of claim 16, wherein the arbiter device is configured to determine for a particular one of the second interfaces, a next available first interface when moving through the ordered set corresponding to the plurality of first interfaces, in a predetermined direction, from a first interface that was selected for the second interface in a previous clock cycle that immediately preceded the given clock cycle.

18. The network device of claim 16, wherein the ordered set corresponding to the plurality of first interfaces is an array of binary numbers indexed according to an order of first interfaces, and wherein each binary number is set to (i) a first value to indicate that a corresponding first interface is available for selection or (ii) a second value to indicate that the corresponding first interface is not available for selection.

19. The network device of claim 16, wherein the one or more integrated circuits are configured to generate the output that indicates the selections of the respective first interfaces for the second interfaces at least by generating an ordered output set corresponding to the plurality of first interfaces, wherein the ordered output set indicates correspondences between the second interfaces and the respective first interfaces selected for the second interfaces.

* * * * *